May 20, 1958
C. C. BENZ
2,835,561
SEPARATION OF MOLTEN SULFUR FROM A
SLURRY OF ITS ORE CONSTITUENTS
Filed Oct. 12, 1953
2 Sheets-Sheet 2
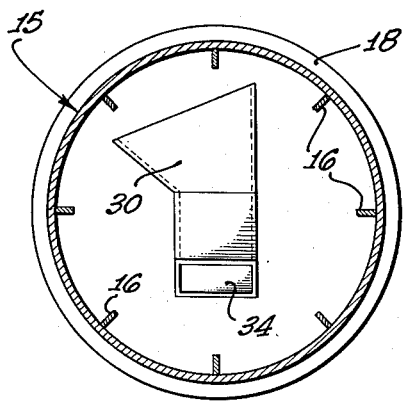
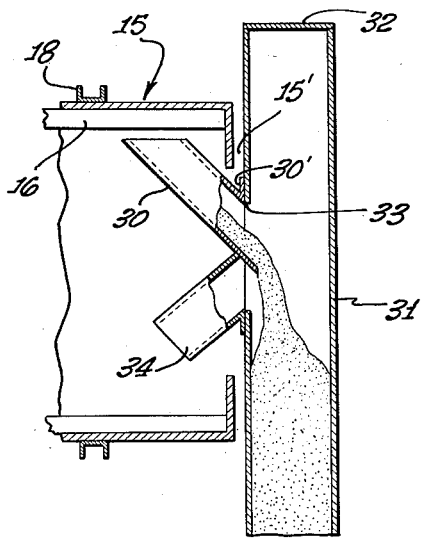
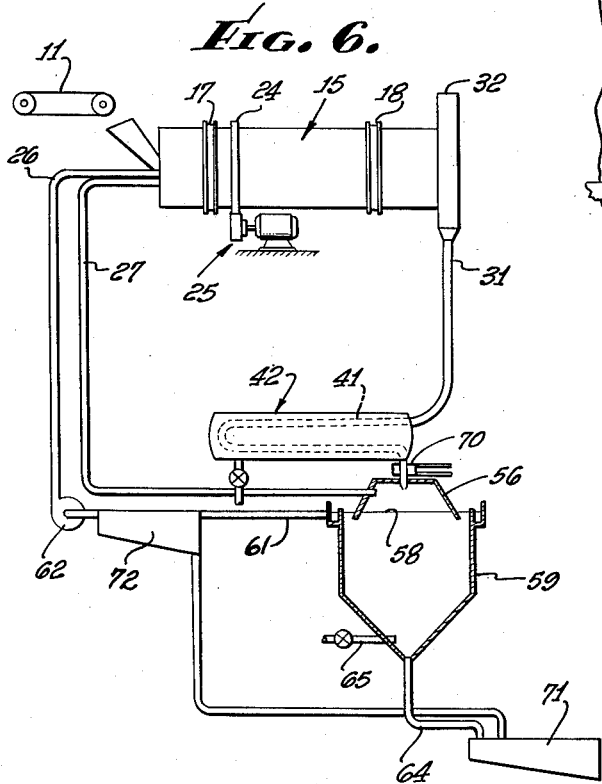
CYRIL C. BENZ,
INVENTOR.
BY
ATTORNEYS.

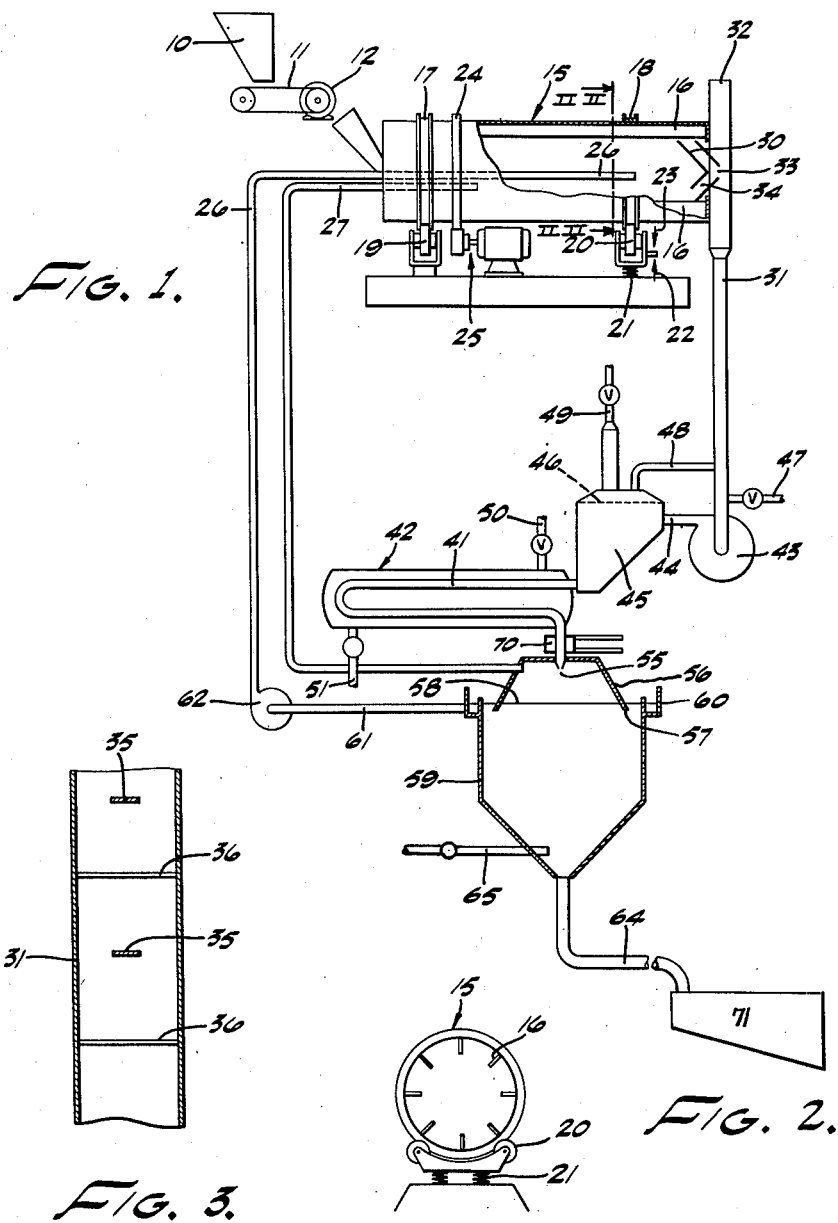

United States Patent Office 2,835,561
Patented May 20, 1958

2,835,561

SEPARATION OF MOLTEN SULFUR FROM A SLURRY OF ITS ORE CONSTITUENTS

Cyril C. Benz, Los Angeles, Calif.

Application October 12, 1953, Serial No. 385,389

3 Claims. (Cl. 23—308)

This invention relates to an economical, simple method of recovering sulphur of high purity and in a finely divided state from ores containing elemental sulphur, and is particularly directed to a method whereby the recovery of sulphur may be had without the necessity of finely grinding the ore and with a minimum requirement of power and heat.

The element sulphur has been known from very early times and is a basic material of industry. The recovery of sulphur from various ores has been the subject of study by many investigators and the quantity normally produced is rarely sufficient to fill industrial requirements because of its many uses. Being a primary raw material, the cost of sulphur must be maintained low. Prior attempts to recover it from sulphur-bearing ores involved expensive equipment (such as centrifuges, Patent 1,318,015), the use of solvents such as carbon disulphide, acetylene, tetrachloride, chlorinated naphthalene, etc., as in Patent 2,118,140, or necessitated the use of a large number of so-called purification steps which were costly and reduced the total yield or recovery. Resort has been had to fine grinding of sulphur ores prior to treatment in an attempt to expose and liberate the sulphur from the gangue of rock and clay, but such fine grinding is expensive, dangerous and ineffective because sulphur has a melting point of about 239° F., becomes heated to above this temperature during dry grinding and in its softened or semi-liquid condition acts as a cementing agent, bonding to or together particles of gangue, the ore thereby reverting to a condition in which it is not appreciably more tractable than it was originally. Also the fine sulphur dust generated during ball milling or fine grinding constitutes an explosion hazard which cannot be minimized. Those prior processes which attempted to cause coalescence of small particles of molten sulphur into larger particles or droplets, were abandoned because the agglomerates or coalesced particles contained gangue occluded therein and thereby created purification problems. Ores containing pyrite are particularly difficult to handle because pyrite is readily wetted by molten sulphur and thus easily occluded. Filtration of molten sulphur-gangue mixtures was found unsatisfactory, this process only permitting the separation of large gangue from a mixture of sulphur and finely divided gangue. Moreover, in substantially all prior processes the replacement of equipment due to the corrosive action of various acids of sulphur formed during the processing precluded commercial operation. Flotation is normally an effective method of separating gangue from a desirable component but fine grinding preliminary to flotation is not satisfactory for the reasons stated hereinabove. Finally, from the standpoint of economics, prior processes (other than the Frasch process) were not thermally economic and did not permit sufficiently high yields to make them successful.

The present invention obviates all of the difficulties of prior methods and is thermally economic since it requires only about 4 boiler horsepower per ton of sulphur ore per hour. The process of the present invention does not require expensive equipment, is adapted to handle various types of ores, including ores containing pyrite or ores which may carry from 10% to over 50% of elemental sulphur contained therein, is capable of recovering over 99% of all of the sulphur contained in the ore and produces a high purity sulphur commanding a higher market price than brimstone. The fire and explosion hazards of prior processes have been eliminated and organic solvents are not employed. Those ores which contained arsenic, selenium, and the like are handled without difficulty, these impurities being substantially reduced and eliminated during the process. Corrosion problems are reduced to a minimum since sulphur dioxide, hydrogen sulphide, sesquioxide and many of the oxy acids, such as hyposulphurous, hydosulphuric, sulphurous, and the like, are eliminated at an early stage of the treatment. The equipment employed is simple, inexpensive and readily available.

Generally stated, the method of the present invention comprises the steps of coarsely crushing ore-containing elemental sulphur, preheating to about 200° F., pulping the ore with warm water in a pulping zone to wet the gangue while permitting evolved gases to escape to the atmosphere and to form a slurry. The method of the present invention permits the use of a slurry containing a very high percentage of solids, above 50% and generally between 60 and 70% by weight. A stream of such slurry is then moved at a pressure of between about 10 and 80 p. s. i. g. through a heating zone where the slurry is heated to above the melting point of the sulphur. The heated slurry is then discharged through an orifice into a flash zone whereby the slurry is subjected to a virtually instantaneous drop in pressure resulting in a reduction in temperature, increase in velocity, and in disintegration and reduction in size of the particles of gangues. The reduction in temperature immediately solidifies the molten sulphur before it has a chance to coalesce in the presence of water-wet gangue so that the solidified particles of sulphur are virtually free from gangue. Advantageously the heated slurry is expanded and discharged into a flash zone including a body of water so that the sulphur and gangue are brought into contact with the body of water while still moving at an appreciable velocity. Low temperature water is supplied to the body which receives the solidified sulphur and gangue and the slurry of finely divided sulphur and gangue. Sulphur in such low temperature water is withdrawn from one portion of said body to a subsequent flotation operation. Warm water (resulting from contact of relatively hot gangue therewith and at a temperature of between about 180° F. and 205° F.) together with very finely divided or dust-like particles of sulphur, is withdrawn or separated from said body of water and recirculated to the pulping zone so as to transfer its heat to incoming ore, in cyclic operation of the process.

The apparatus described hereinafter in greater detail and particularly adapted for use in carrying out the method is simple, does not necessitate the use of ball mills and in general comprises a rotatable, cylindrical pulper, a conduit for the resulting slurry, a heater in which the slurry is heated to the desired temperature, and a flash tank from which the solidified sulphur without occluded gangue therein is removed with the gangue. Special means are provided for conveying steam and hot water from the flash zone to the pulper; for controlling the orifice leading to the flash zone; for economically imparting a pressure to the thick slurry as it travels through the heater, and other arrangements which will become evident from the more detailed description given hereinafter.

It is an object of the present invention, therefore, to disclose and provide a thermally economic method of recovering sulphur of high purity and in a finely divided state from ores containing sulphur.

Another object of the invention is to disclose and provide a method whereby sulphur may be reduced to molten condition in the presence of gangue and then solidified before such molten sulphur occludes or becomes cemented to gangue, whereby the sulphur may be more readily separated from the gangue.

A further object of the invention is to disclose and provide means and methods of treating sulphur ores whereby gases contained in the ore or resulting from contact of hot water therewith are effectively removed.

A further object of the invention is to disclose and provide a method of recovering sulphur from ores wherein flash evaporation of water is employed in disintegrating particles of porous gangue and in chilling molten sulphur.

These and various other objects, uses and advantages of the invention will become apparent from the description given herein. In order to facilitate understanding, reference will be had to the appended diagram which illustrates, in Fig. 1, in partly diagrammatic fashion, an arrangement of apparatus in which the process may be carried out.

Fig. 2 is a vertical section through the pulper, along plane II—II of Fig. 1.

Fig. 3 is an enlarged longitudinal section through a non-choking slurry conduit.

Fig. 4 is an enlarged transverse section through the pulper taken along plane II—II showing a discharge chute arrangement.

Fig. 5 is an enlarged longitudinal section through the end portion of the pulper further illustrating the chute arrangement in elevation.

Fig. 6 is a diagrammatical representation of the apparatus of Fig. 1, embodying certain modifications.

It is to be understood that any ore containing sulphur may be treated. Ores containing from 10% to over 50% of elemental sulphur, contained in a gangue matrix of silica, limestone, gypsum, clay and the like, may be treated by the existing process. The process takes advantage of the fact that most gangue is hydrophilic whereas sulphur is hydrophobic and has a high surface tension.

As previously stated, it is not necessary to reduce the ore to a fine state of division; in general practice the ore is crushed, as by a jaw crusher and rolls so as to virtually pass a 4 to 10 mesh screen. Such crushed ore may be supplied from a hopper 10 to a controllable feeding conveyor 11, the speed of such conveyor being suitably controlled by a motor drive indicated at 12, whereby the rate of feed may be accurately regulated. The crushed ore is fed into one end of an elongated, virtually cylindrical pulper 15 provided with longitudinally extending internal lifting plates or fins 16. The external surface of the pulper 15 may be provided with a pair of tires 17 and 18 resting upon supporting rollers such as 19 and 20. The rollers 19 may be mounted upon a firm base; the yoke in which rollers 20 are journaled may be mounted upon springs 21 so that when the pulper 15 is fully loaded the discharge end of the pulper is at a lower level than the inlet end so as to facilitate the travel of material through the pulper towards the discharge end and actuate controlling mechanisms, as will be described more fully hereafter. Rotation is imparted to the entire pulper in any suitable manner as, for example, by means of a spur gear 24 carried by the external surface of the pulper and a motor driven pinion gear assembly 25, the driving means being preferably adjacent the feed end of the pulper.

Warm water is supplied to the pulper through line 26 and exhaust low pressure steam is also supplied to the inlet end of the pulper by line 27, this exhaust steam condensing within the pulper. The amount of warm water so supplied is controlled so as to thoroughly wet the gangue and form a saturated slurry in warm water. It may be noted that the slurry is preferably first contacted with the exhaust steam and preheated thereby before being brought into contact with the warm water supplied by line 26, this being accomplished by extending line 26 further into the pulper, the end of line 26 being preferably in the discharge third of the length of the pulper 15.

The pulper is operated so as to reach optimum proportions between ore and water and to discharge the heaviest slurry that can be handled in the balance of the process. The mixing action in the pulper keeps the slurry dispersed so that very little settling or classification can take place. The discharge apparatus from the pulper 15, illustrated in the appended drawing, includes a stationary scoop or chute 30 adapted to receive the slurry and guide it toward a vertical conduit 31 which is preferably open at the top at 32, said upper open end extending above the inlet from chute 30. Figs. 4 and 5 illustrate an arrangement of the discharge apparatus, the chute 30 being connected to conduit 31 as at 30'. It is understood that an open space 15' exists between the end of rotating pulper 15 and the discharge apparatus to permit free exit of gases. The upper portion of chute 30 is in communication with stack or conduit 31 through a gas discharge port 33 so that any and all contained or generated gases may be removed from the system at this stage. Sulphur dioxide, volatile sulphur chlorides and volatile oxy acids and oxides of sulphur, which normally cause corrosion difficulties, are thus permitted to escape before entering the other equipment. Excess slurry incapable of falling by gravity down the conduit 31 is returned to the pulper by chute 34.

The slurry thus obtained and fed to conduit 31 preferably contains over 50% of solids and generally between 60 and 70% of solids. This thick slurry is preferably maintained at a temperature of between about 190° or 200 and 210° F. The use of such heavy slurries has been deemed impossible heretofore, but it has been found that such slurries can be pumped and moved when treated in the manner described hereinabove. In order to prevent the slurry from packing in the conduit 31 transversely extending, horizontally disposed rods or bars such as 35, 36 and the like are positioned within the vertical conduit 31, successive bars having their axes at right angles to each other so as to break up the downwardly flowing column of slurry and prevent packing. By the use of this construction it has been found possible to employ a vertical or steeply inclined conduit 60 to 100 feet in height without clogging or packing of the slurry, thereby permitting the lower portion of the slurry to be supplied to a heating zone at an adequate pressure. Flow of slurry in the conduit 31 can be initiated without difficulty even after a shutdown period. The bars or rods 35 and 36 are of such size that at a plane passing through a rod or bar between about 25% to 35% of the total cross sectional area of the conduit 31 is occupied by the bar.

In the performance of the process it is desired to pass the heavy slurry, in the form of a moving stream or body, through the conduit 41 extending through a heater 42. If the contour of the land upon which the plant is built so permits or if the plant is sufficiently high the lower end of conduit 31 may connect directly with the inlet end of conduit 41 in the heater, the weight of the column of slurry being thus utilized in maintaining the slurry at a desired pressure within the conduit 41. This modification is shown in Fig. 6 where similar elements are identified by similar numbers. In most instances, however, it has been found desirable to employ a sand pump such as, for example, the centrifugal pump 43, this pump receiving the slurry from conduit 31 and discharging it as by line 44 into a combined concentrator and gas release device 45, this device including an enclosed housing provided with a screen 46 near its top. In initiating the operation of the sand pump some auxiliary water may be supplied by valve line 47 connected adjacent the intake port of pump 43; slurry together with this auxiliary water is pumped into slurry concentrator 45, the discharge line of the pump being connected to the upper portion of such concentrator and by reason of the size of the concentrator 45 separation takes place between such auxiliary water and the slurry. The auxiliary or excess water moves upwardly through screen 46 into line 48 leading back to conduit 31. Once circulation has been established through line 48, the supply of auxiliary water through valve 47 is discontinued. Any gases contained in the slurry at this stage of the process may be constantly or periodically discharged from the concentrator 45 through an upstanding valved gas vent 49. By this arrangement, slurry under considerable pressure (say 50 p. s. i. g.) may be thus supplied to conduit 41 extending through the heater 42.

Heater 42 is preferably jacketed and supplied with steam through line 50, condensate water being returned by line 51 to the boiler supplying such steam. Steam of 20 to 80 p. s. i. g. is adequate depending upon the pressure to which the slurry is supplied to conduit 41, the combination of pressure and temperature being at all events sufficient to raise the sulphur in such slurry to above its melting point; pressures and temperatures above minimal are prepared.

The discharge end of conduit 41 is provided with a restricted orifice 55 leading into a flash chamber. The arrangement illustrated shows the orifice 55 downwardly directed into a flash chamber formed by a hood 56 extending into a body of water 58 within a tank 59. An overflow gutter 60 surrounds the upper marginal edge of the side walls of tank 59. The lower margin 57 of hood 56 extends beneath the surface of the water in tank 59 a desired distance during operation and overflow water will flow into the gutter 60. This overflow water distributed by line 61 may be conveyed as by pump 62 to line 26 which discharges into the pulper 15, or as shown in Fig. 6 it may pass through a concentrator 72, the concentrate then going to flotation cells 71 while the warm water goes to the pulper 15.

Means are provided for controlling the orifice 55. Although various mechanical needle valves and the like may be used to open and close orifice 55, an effective method of preventing or initiating the flow of hot slurry (molten sulphur and gangue) through the orifice 55 may comprise a chamber or casing 70 surrounding the discharge end of conduit 41 adjacent the orifice 55, such casing being controllably supplied either with cold water so as to chill the hot slurry and form a solid plug adjacent the orifice 55, or alternatively such casing 70 can be supplied with hot pressure steam so as to melt the sulphur and uncement the plug permitting the hot molten slurry to pass through the orifice 55 into the flash chamber.

The bottom of tank 59 is preferably conical, is provided with a discharge line 64 and a tangentially and preferably downwardly directed valved inlet line 65 through which water is admitted. The discharge line 64 conveys a pulp consisting of sulphur, gangue and relatively cold water to froth flotation cells 71.

In operation of the arrangement described hereinabove, it will be noted that the coarsely crushed ore is first preheated in the pulper 15, thereby allowing occluded gases to be driven out of the relatively porous ore particles. The ore is then pulped and wetted with warm water which impregnates the crushed ore particles and thoroughly wets the gangue, resulting in a thick slurry. This thick slurry is then conveyed, as by conduit 31, sand pump 43, etc., into the heating coil or heating conduit 41 where the slurry is subjected to a temperature in excess of 240° F. and preferably to a temperature of about 250°–280° F. Pressures on the order of 30–60 p. s. i. g. are used adjacent the discharge nozzle 55 of conduit 41. Upon being so heated sulphur is melted in the slurry and becomes free to move. The high surface tension of molten sulfur causes the sulphur to migrate out of or away from the particles of gangue and form spherical globules. The hydrophilic nature of the gangue repels the molten sulphur; the uncementing of the gangue by reason of the change of the sulphur to liquid state and migration, causes further disintegration of the gangue. The hydrophilic nature of the gangue and hydrophobic nature of the sulphur prevents occlusion of gangue particles in the globules of molten sulphur.

This relatively fluid, hot slurry containing discrete particles of liquid sulphur and solid, wet gangue passes through the restricted orifice 55 into the flash chamber formed by hood 56. The pressure in such hood is on the order of only 2 to 8 ounces of pressure, and at all events below 2 p. s. i. g. Some of the water contained in the slurry discharged at high velocity through the restricting orifice, is almost instantaneously converted into steam. Water contained within larger particles of gangue causes disintegration of such gangue by reason of the rapid conversion of some water into steam. Drop in pressure results in immediate drop in temperature, below the melting point of sulphur. Only about between 7% and 18% of the water is flashed into steam, thereby leaving a wet but hot gangue to which sulphur will not adhere. As a result a fine spray of sulphur particles and gangue particles is ejected at high velocity from the nozzle 55 on to the surface of the body of water maintained in tank 59. The water supplied to the tank 59 through supply line 65 is generally at a normal atmospheric temperature or therebelow. The gangue particles are further water-wetted while the discrete globules of sulphur are chilled even further than they were as a result of the drop in pressure.

Steam generated in the flash chamber is discharged by line 27 into the pulper 15 for the purpose of again preheating additional ore. Since the specific gravity of gangue and solid sulphur is on the order of 2.1–2.3 both sulphur and gangue settle to the bottom of tank 59 and are withdrawn therefrom through discharge outlet 64 in the form of a pulp or slurry.

As a result of the discharge of the hot mixture into the flash chamber, some disintegration takes place and a considerable quantity of very finely divided sulphur is obtained. These fines do not settle as rapidly and tend to accumulate in the upper portion of the body of water in tank 59 being skimmed therefrom by the excess water supplied through lines 65, these fines and water warmed by contact with hot particles of gangue passing into the skimming gutter 60 from whence such fines and warm water are distributed by line 61 and pump 62 into line 26 for treatment of additional ore.

Attention is also called to the fact that any and all volatile gases either originally contained in the ore and released by the preheating with steam in the first part of the pulper or generated during the pulping operation or generated during the impact of particles upon the surface of the water in tank 59 during flashing, are discharged to the atmosphere either through gas outlet 33 or through the gas vent 49. Gases from the flash zone of tank 59 are sent to the pulper by line 27 and the gases eventually discharge at 33.

Although the process provides for the discharge of acid gases at several points, and thereby reduces corrosion problems, in some instances it may be desirable to add crushed limestone or hydrated lime at the pulper so as to maintain the pH to about 6–8.

Remarkable results have been obtained by this process. For example, one sulphur ore (crushed to 8 mesh) was treated in the manner stated, being supplied to a 6" diameter heating coil 41 in the form of a slurry containing 65% solids. A pressure of 35 pounds and a temperature of 265° F. existed at the outlet of such heating coil, which was provided with an orifice having a diameter of 5/16". The slurry was discharged from this orifice at the rate of between 75 and 80 pounds per minute. The pulp from the flash chamber tank 59 was subjected to froth flotation, pulp density being adjusted to about 20% solids and usual flotation reagents such as pine oil being employed. The original ore contained 54.1% sulphur and over 99% of this sulphur was recovered as a flotation concentrate and midlings. The tailings contained less than one-half of 1% of sulphur. The sulphur recovered was very finely divided; 21.2% was retained on 100 mesh screen and 36% passed through a 200 mesh screen.

The thermal efficiency of the process is also very remarkable. It takes 74,000 B. t. u. to heat one ton of ore from 62° F. to 212° F. to produce a 65% slurry. If it is assumed that the ore only contains 25% sulphur, it takes 116,900 B. t. u.'s to raise it from 205° F. to 275° F. It is, therefore, evident that a 4 or 5 horsepower boiler will furnish adequate heat to treat one ton of ore per hour, the waste heat from the flash chamber being more than adequate to preheat the ore. The heat of the gangue and in the solidified sulphur particles is transmitted to the water used in pulping. Maximum thermal efficiency can be obtained by covering all lines and equipment with adequate heat insulation.

In order to facilitate the continuous application of the process, advantage is taken of the spring-biased roller 20 yoke on pulper 15. In the event the pulper 15 becomes overloaded the yoke carrying rollers 20 will move downwardly and close contact 22 which may be connected to any suitable relay circuit adapted to shut down or decrease the speed at which feeder belt 11 is motor driven and, if desired, simultaneously and proportionately either shut down or decrease the speed of the motor driving pump 62. In the event the pulper is underloaded, contact 23 is closed, to start or increase the speed of the feeder and pump. Such relay and control systems are well known in electrical art and it is desired to point out their application to the process and their actuation by the pulper.

All changes and modifications coming within the scope of the claims are embraced thereby.

I claim:

1. In a thermally economical method of recovering sulphur of high purity and in a finely divided state from ores containing sulphur, the steps of: coarsely crushing ore containing elemental sulphur and gangue, preheating the ore, pulping the ore with warm water in a pulping zone to wet the gangue while permitting evolved gases to escape to the atmosphere and to form a slurry containing between about 50% and 70% solids by weight; moving a stream of such slurry at a pressure of between about 20 and 80 p. s. i. g. through a heating zone; heating the slurry to above 240° F. in said zone; and passing the heated slurry through a restricted orifice into an enlarged flash zone including a body of water whereby the slurry is subjected to a virtually instantaneous drop in temperature and pressure with concurrent generation of steam while said slurry is moving at high velocity into contact with the body of water; supplying low temperature water to said body; withdrawing a pulp of finely divided sulphur and gangue in low temperature water from the lower portion of said body; conveying warm water and suspended fines from the upper portion of said body to the pulping zone and conveying steam generated in the flash zone for preheating incoming ore.

2. In a method of recovering sulphur from ores containing sulphur, the steps of: crushing ore containing elemental sulphur and gangue to pass a 4 to 10 mesh sieve, preheating the crushed ore to facilitate the expulsion of contained gases therefrom, and pulping the preheated ore with warm water by cascading and tumbling water and ore to impregnate and wet particles of gangue and form a slurry containing between about 50% and 70% of solids; subjecting a flowing stream of said slurry to a pressure of between about 20 and 80 p. s. i. g. and a temperature of between about 240° and 280° F.; discharging the heated slurry into an enlarged flash zone, including a body of water maintaining said flash zone, at a pressure of less than 2 p. s. i. g. whereby the slurry is subjected to a virtually instantaneous drop in temperature and pressure and water contained therein is converted into steam; conveying steam generated in said flash zone into contact with incoming crushed ore for preheating the latter; supplying low temperature water to said body, removing warm water and suspended fines from said body, conveying said removed warm water and fines into contact with preheated crushed ore; and removing from said body a pulp of cool water, gangue and sulphur particles and subjecting said pulp to flotation to separate sulphur from the gangue.

3. In a method of recovering sulphur from ores containing sulphur, the steps of: crushing ore containing elemental sulphur and gangue to pass a 4 to 10 mesh sieve, preheating the crushed ore to facilitate the expulsion of contained gases therefrom, and pulping the preheated ore with warm water by cascading and tumbling water and ore to impregnate and wet particles of gangue and form a slurry containing between about 50% and 70% of solids; diluting the slurry to pumpable consistency, pumping the slurry into a zone discharging gases from said zone and removing excess water from the pulp in said zone, reusing the excess water for dilution of additional slurry and discharging the rethickened slurry from said zone into a heating zone wherein a flowing stream of said slurry is heated to a temperature of between about 240° and 280° F. at a pressure of between about 20 and 80 p. s. i. g.; discharging the heated slurry directly into an enlarged flash zone maintained at a pressure of less than 2 p. s. i. g. whereby the slurry is subjected to a virtually instantaneous drop in temperature and pressure and water contained therein is converted into steam; and conveying steam generated in said flash zone into contact with incoming crushed ore for preheating the latter.

References Cited in the file of this patent

UNITED STATES PATENTS

| 1,729,246 | Crowley | Sept. 24, 1929 |
| 1,992,611 | Grindrod | Feb. 26, 1934 |
| 2,537,842 | McGauley et al. | Jan. 9, 1951 |
| 2,560,807 | Lobo | July 17, 1951 |
| 2,568,400 | Kearby | Sept. 18, 1951 |
| 2,735,787 | Eastman et al. | Feb. 21, 1956 |

OTHER REFERENCES

Chemical Abstracts, volume 47, Number 3, page 1347, February 10, 1953.

Chemical Engineering, March 1951, pages 128, 183.